(12) United States Patent
Corley (10) Patent No.: US 11,130,470 B1
(45) Date of Patent: Sep. 28, 2021

(54) WEIGHT SENSOR VEHICLE SECURITY DEVICE

(71) Applicant: Ronald Corley, New Orleans, LA (US)

(72) Inventor: Ronald Corley, New Orleans, LA (US)

( * ) Notice: Subject to any disclaimer, the term of this patent is extended or adjusted under 35 U.S.C. 154(b) by 312 days.

(21) Appl. No.: 16/267,466

(22) Filed: Feb. 5, 2019

(51) Int. Cl.
| | | |
|---|---|---|
| *B60R 25/04* | (2013.01) | |
| *B60R 21/015* | (2006.01) | |
| *B60R 25/25* | (2013.01) | |
| *G06F 16/9035* | (2019.01) | |
| *G05D 1/02* | (2020.01) | |

(52) U.S. Cl.
CPC ........ *B60R 25/04* (2013.01); *B60R 21/01516* (2014.10); *B60R 25/25* (2013.01); *G05D 1/0272* (2013.01); *G06F 16/9035* (2019.01); *B60R 2025/0415* (2013.01)

(58) Field of Classification Search
CPC ... B60R 25/04; B60R 25/25; B60R 21/01516; B60R 2025/0415; G05D 1/0272; G06F 16/9035
See application file for complete search history.

(56) References Cited

U.S. PATENT DOCUMENTS

| | | | | |
|---|---|---|---|---|
| 5,585,779 A | * | 12/1996 | Halikias | ............. B60R 25/1003 180/287 |
| 6,369,459 B1 | * | 4/2002 | Stevens | .................. B60R 25/04 307/10.3 |
| 7,043,997 B2 | | 5/2006 | Mattson | |
| 8,761,998 B2 | | 6/2014 | Chen | |
| 8,820,782 B2 | * | 9/2014 | Breed | .................... B60N 2/888 280/735 |
| 9,002,596 B2 | | 4/2015 | Morris | |
| D734,192 S | | 7/2015 | Phillips | |
| 9,760,702 B1 | | 9/2017 | Kursun | |
| 2012/0299344 A1 | * | 11/2012 | Breed | ................ G01G 19/4142 297/217.1 |

FOREIGN PATENT DOCUMENTS

| | | | |
|---|---|---|---|
| CA | 2799693 | | 6/2013 |
| GB | 2322956 A | * | 9/1998 |

* cited by examiner

*Primary Examiner* — Brian P Sweeney (74) *Attorney, Agent, or Firm* — Kyle A. Fletcher, Esq.

(57) ABSTRACT

The weight sensor vehicle security device comprises a vehicle and a security circuit. The security circuit measures the weight of the operator. The operator enters a security code into the security circuit. The operator then enters a security code. The security circuit compares the measured weight of the operator to a weight of the operator that is associated and stored with the security code. If the measured and stored weights match, the security system enables the operation of the vehicle. After the vehicle travels a previously determined distance, the security circuit repeats the procedure. If the measured and stored weights do not match, the security system disables the operation of the vehicle.

17 Claims, 6 Drawing Sheets

WEIGHT SENSOR VEHICLE SECURITY DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, a biometric system for preventing unauthorized operation of a vehicle. (B60R25/25)

SUMMARY OF INVENTION

The weight sensor vehicle security device is a security device that prevents the unauthorized operation of a vehicle. The weight sensor vehicle security device comprises the vehicle and a security circuit. The security circuit installs in the vehicle. The vehicle is adapted for use with an operator. The vehicle further comprises a seat, a VECU. The VECU further comprises an ignition device. The operator sits in the seat when operating the vehicle. The seat, the VECU, and the ignition device are defined in greater detail elsewhere in this disclosure. The security circuit installs in the vehicle. The security circuit is a biometric device. The security circuit measures the weight of the operator. The operator enters a security code into the security circuit.

If the first measured weight of the operator matches the measurement of the weight of the operator that is associated and stored with the security code, the security circuit enables the ignition of the vehicle. If the first measured weight of the operator does not match the measurement of the weight of the operator that is associated and stored with the security code, the security circuit disables the ignition of the vehicle. After the ignition of the vehicle, the security system monitors the span of the distance traveled by the vehicle.

After the vehicle travels a previously determined distance, the security system measures the weight of the operator in the seat for a second time. If the second measured weight of the operator matches the measurement of the weight of the operator that is associated and stored with the security code, the security circuit allows the vehicle to continue. If the second measured weight of the operator does not match the measurement of the weight of the operator that is associated and stored with the security code, the security circuit disables the ignition of the vehicle.

These together with additional objects, features and advantages of the weight sensor vehicle security device will be readily apparent to those of ordinary skill in the art upon reading the following detailed description of the presently preferred, but nonetheless illustrative, embodiments when taken in conjunction with the accompanying drawings.

In this respect, before explaining the current embodiments of the weight sensor vehicle security device in detail, it is to be understood that the weight sensor vehicle security device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the weight sensor vehicle security device.

It is therefore important that the claims be regarded as including such equivalent construction insofar as they do not depart from the spirit and scope of the weight sensor vehicle security device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The weight sensor vehicle security device 100 (hereinafter invention) is a security device that prevents the unauthorized operation of a vehicle 101. The invention 100 comprises the vehicle 101 and a security circuit 102. The security circuit 102 installs in the vehicle 101. The vehicle 101 is adapted for use with an operator 151. The operator 151 is defined in greater detail elsewhere in this disclosure. The vehicle 101 further comprises a seat 111 and a VECU 112. The VECU 112 further comprises an ignition device 113. The operator 151 sits in the seat 111 when operating the vehicle 101. The seat 111, the VECU 112, and the ignition device 113 are defined in greater detail elsewhere in this disclosure. The security circuit 102 installs in the vehicle 101. The security circuit 102 is a biometric device. The security circuit 102 measures the weight of the operator 151. The operator 151 enters a security code into the security circuit 102.

If the first measured weight of the operator 151 matches the measurement of the weight of the operator 151 that is associated and stored with the security code, the security circuit 102 enables the ignition device 113 of the vehicle 101. If the first measured weight of the operator 151 does not match the measurement of the weight of the operator 151 that is associated and stored with the security code, the security circuit 102 disables the ignition device 113 of the vehicle 101. After the ignition device 113 of the vehicle 101, the security system monitors the span of the distance traveled by the vehicle 101.

After the vehicle 101 travels a previously determined distance, the security system measures the weight of the operator 151 in the seat 111 for a second time. If the second measured weight of the operator 151 matches the measurement of the weight of the operator 151 that is associated and stored with the security code, the security circuit 102 allows the vehicle 101 to continue. If the second measured weight of the operator 151 does not match the measurement of the weight of the operator 151 that is associated and stored with the security code, the security circuit 102 disables the ignition device 113 of the vehicle 101.

The vehicle 101 is a motorized device. The vehicle 101 is configured for use on a road network. The vehicle 101 is defined in greater detail elsewhere in this disclosure.

The seat 111 is the structure within the vehicle 101 in which the operator 151 sits during the operation of the vehicle 101. The weight of the operator 151 is measured while the operator 151 is in the seat 111. The seat 111 is further defined elsewhere in this disclosure.

The VECU 112 is an acronym for vehicle 101 engine control unit. The VECU 112 is the electrical system of the vehicle 101. The VECU 112 controls the electrical operation of the vehicle 101. The security circuit 102 communicates with the VECU 112 to enable and disable the operation of the vehicle 101. The VECU 112 is further defined elsewhere in this disclosure.

The ignition device 113 is an electrically powered device. The ignition device 113 initiates the operation of the vehicle 101. The ignition device 113 comprises a switching circuit that requires that a switch remains in a set position while the vehicle 101 is operating. The operation of the ignition device 113 including the switching circuit is managed by the VECU 112. Specifically, the VECU 112 can override the switching circuit of the ignition device 113 to disable the vehicle 101.

The security circuit 102 is a programmable electrical circuit. The security circuit 102 is an electrical circuit. The security circuit 102 mounts in the vehicle 101. The security circuit 102 monitors the GPS coordinates of the vehicle 101. The security circuit 102 measures the weight of the operator 151 of the vehicle 101 while in the vehicle 101. The security circuit 102 communicates with the VECU 112 to enable the operation of the ignition device 113. The security circuit 102 communicates with the VECU 112 to disable the operation of the ignition device 113.

The security circuit 102 maintains a database of operators 151 authorized to operate the vehicle 101. The security circuit 102 stores a security code that is unique for each operator 151 authorized to operate the vehicle 101. The security circuit 102 stores in the database the weight of the operator 151 that is associated with each security code. The security circuit 102 uses the measured weight of the operator 151 to biometrically validate that an operator 151 entering a security code is the operator 151 associated with the security code.

The security circuit 102 comprises a logic module 121, a GPS module 122, a load cell 123, and a keypad 124.

The logic module 121 is a readily and commercially available programmable electronic device that is used to manage, regulate, and operate the security circuit 102. Depending on the specific design and the selected components, the logic module 121 can be a separate component within the security circuit 102 or the functions of the logic module 121 can be incorporated into another component within the security circuit 102.

The GPS module 122 is an electrical device that communicates with the GPS to determine the GPS coordinates of the GPS module 122. When queried by the logic module 121, the GPS module 122 transfers the GPS coordinates to the logic module 121.

The logic module 121 communicates with the GPS module 122 to determine the GPS coordinates of the GPS module 122 when the operator 151 first sits in the seat 111. The logic module 121 regularly downloads the GPS coordinates of the GPS module 122 to the logic module 121 such that the logic module 121 can calculate how far the vehicle 101 has traveled with the operator 151 in the seat 111.

The load cell 123 is a weight sensor that mounts in the seat 111. The load cell 123 transmits an electrical signal that: a) indicates that an operator 151 is in the seat 111; and, b) allows the logic module 121 to calculate the weight of the operator 151.

The keypad 124 is an interface device. The logic module 121 controls and monitors the operation of the keypad 124. The operator 151 uses the keypad 124 to enter the security code required to enable the operation of the vehicle 101.

The logic module 121 compares the entered security code with the security codes maintained in the database of operators 151 authorized to operate the vehicle 101. The logic module 121 compares the entered measured weight of the operator 151 with the measured weight stored and associated with the security code that is maintained in the database of operators 151 authorized to operate the vehicle 101.

The following five paragraphs describe the operation of the logic module 121.

Figure 1:
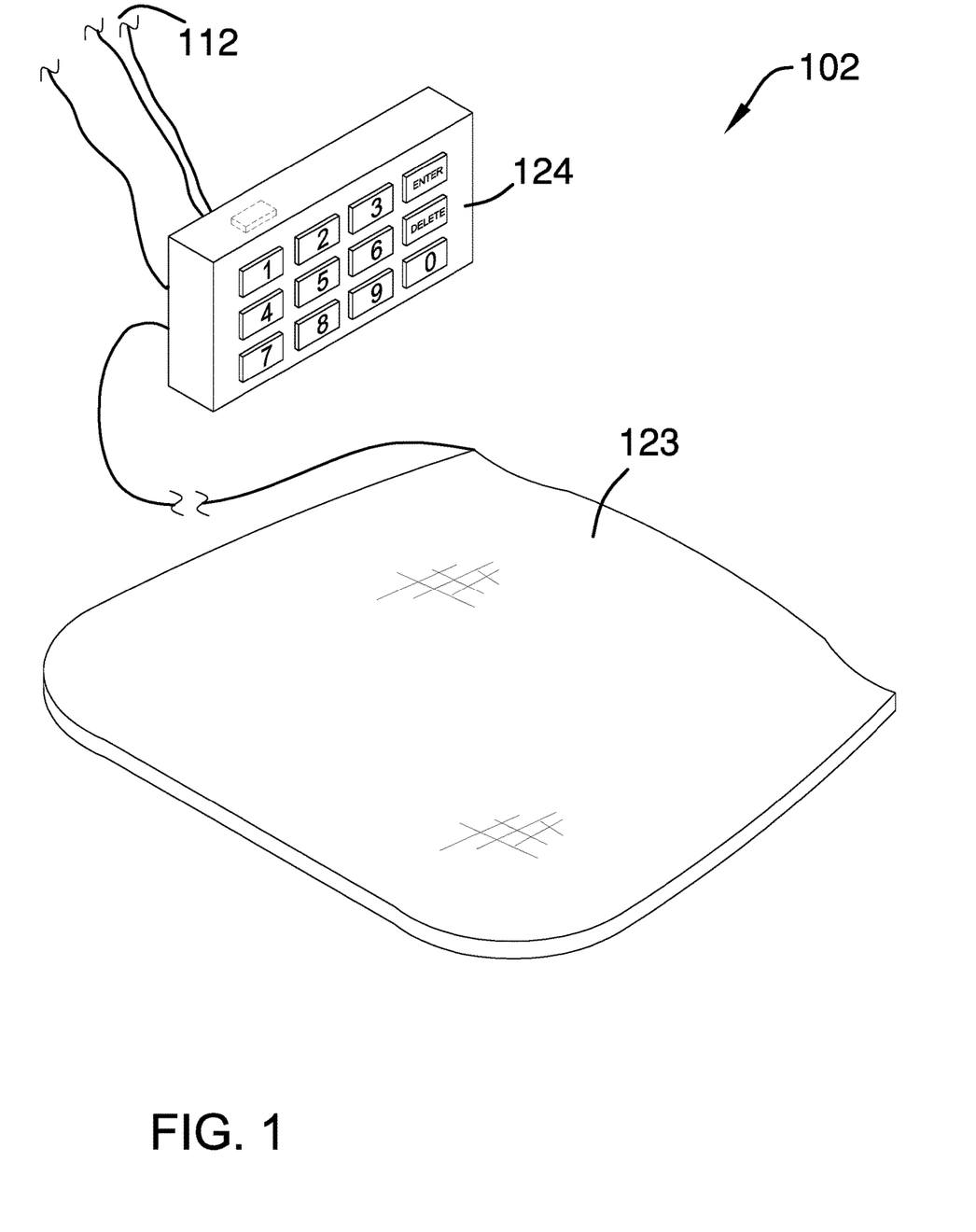
FIG. 1 is a perspective view of an embodiment of the disclosure.
Figure 2:
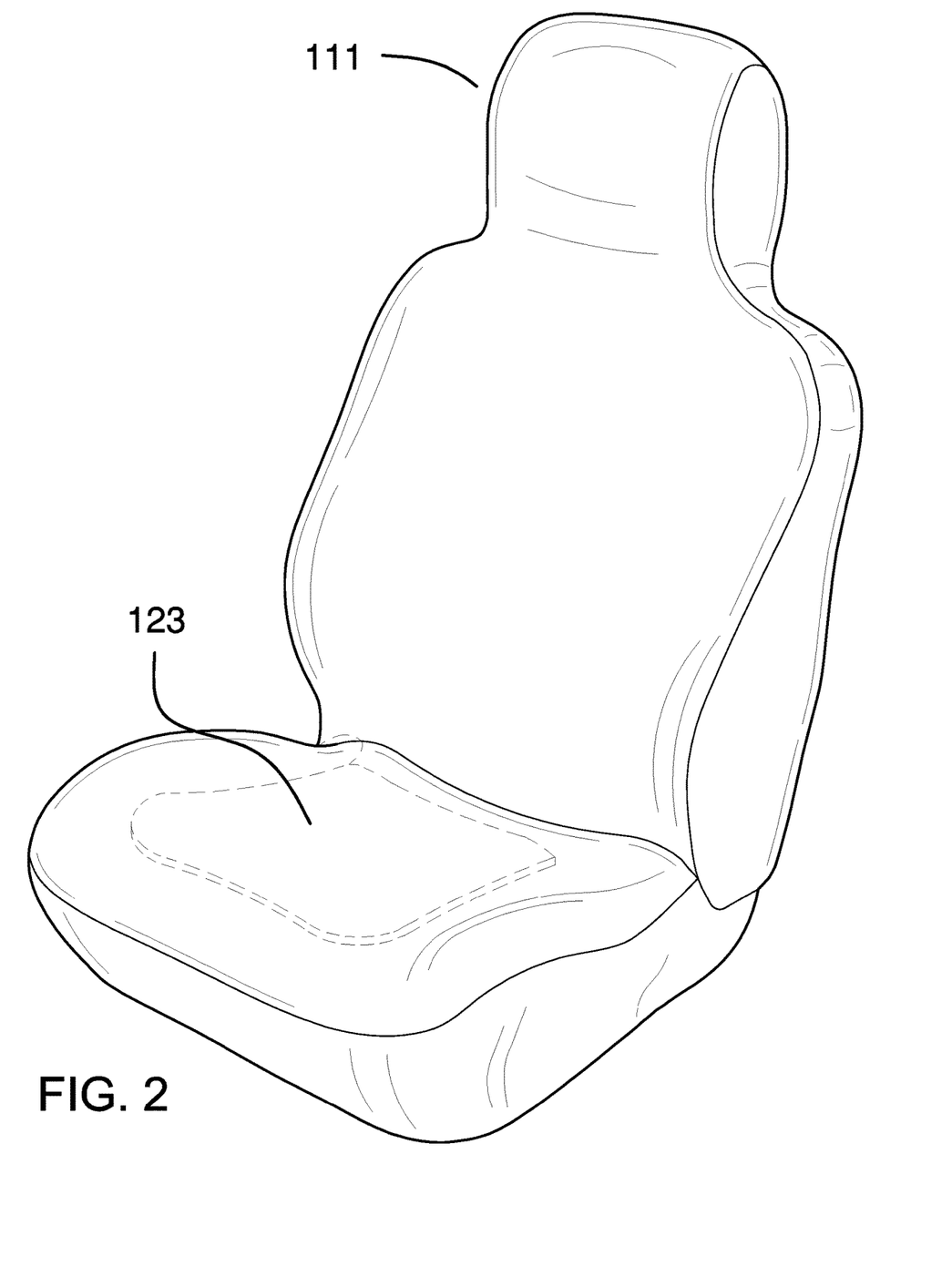
FIG. 2 is a perspective in-view of an embodiment of the disclosure.
Figure 3:
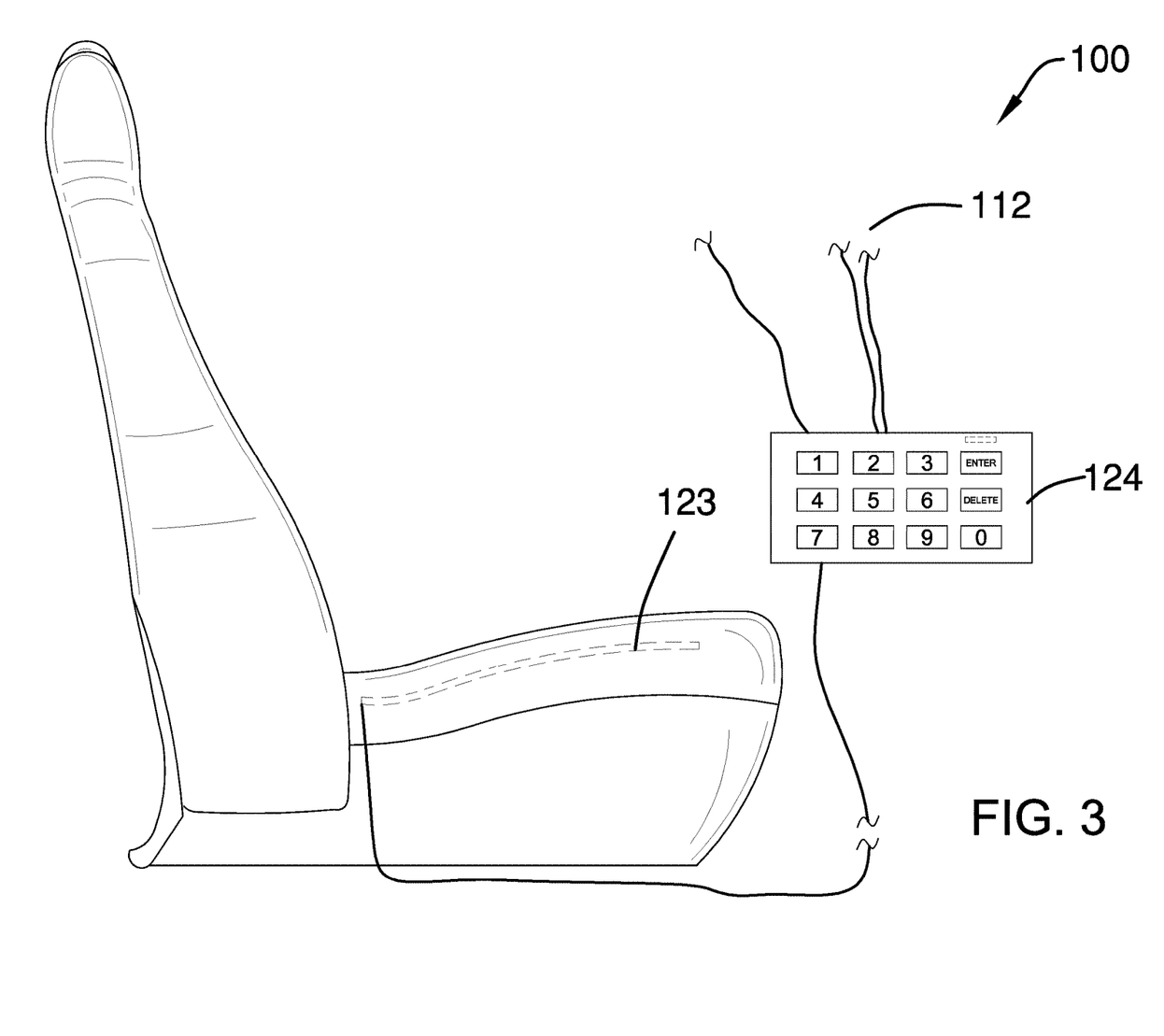
FIG. 3 is a side view of an embodiment of the disclosure.
Figure 4:
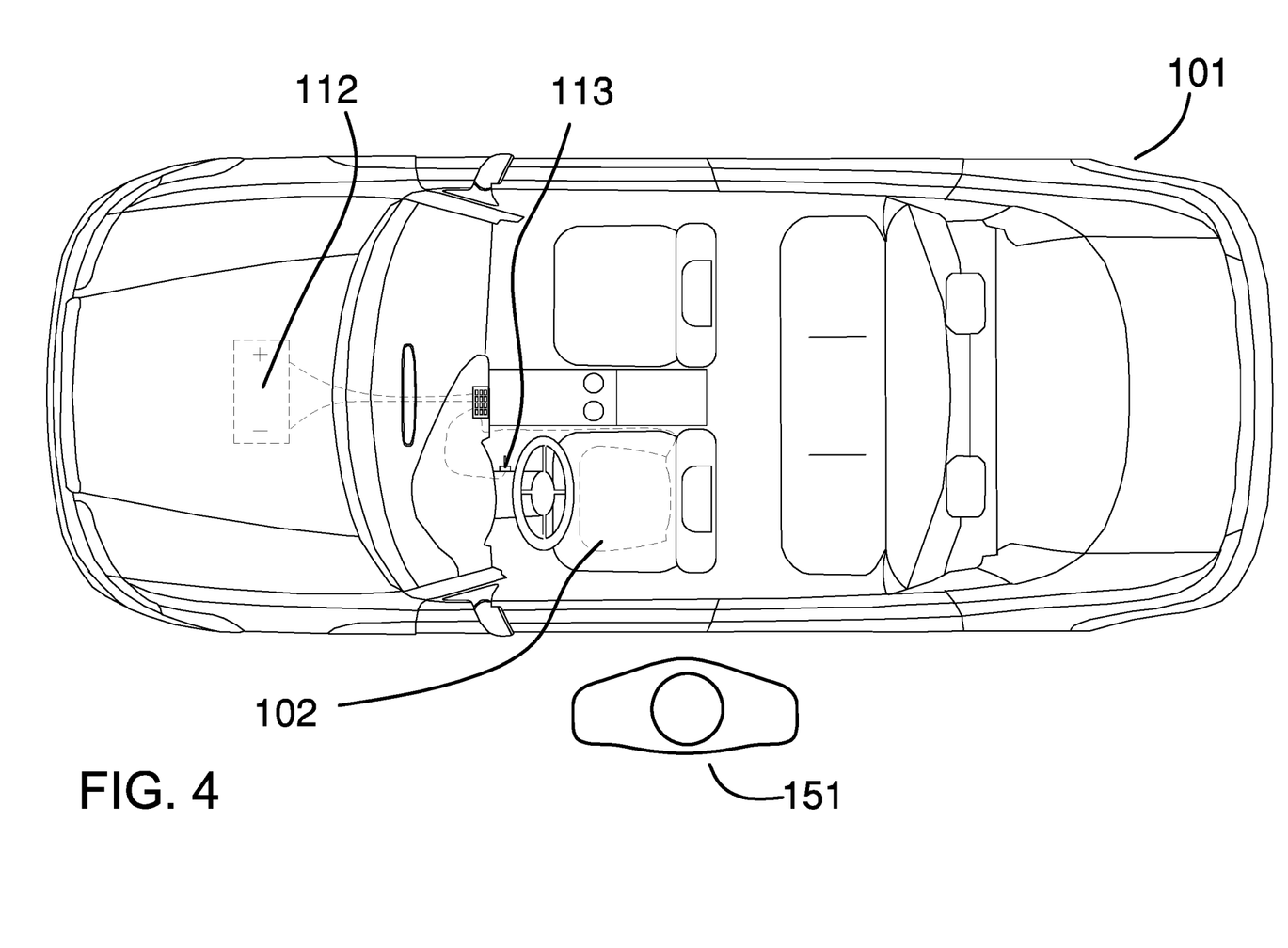
FIG. 4 is a top in-view of an embodiment of the disclosure.
Figure 5:
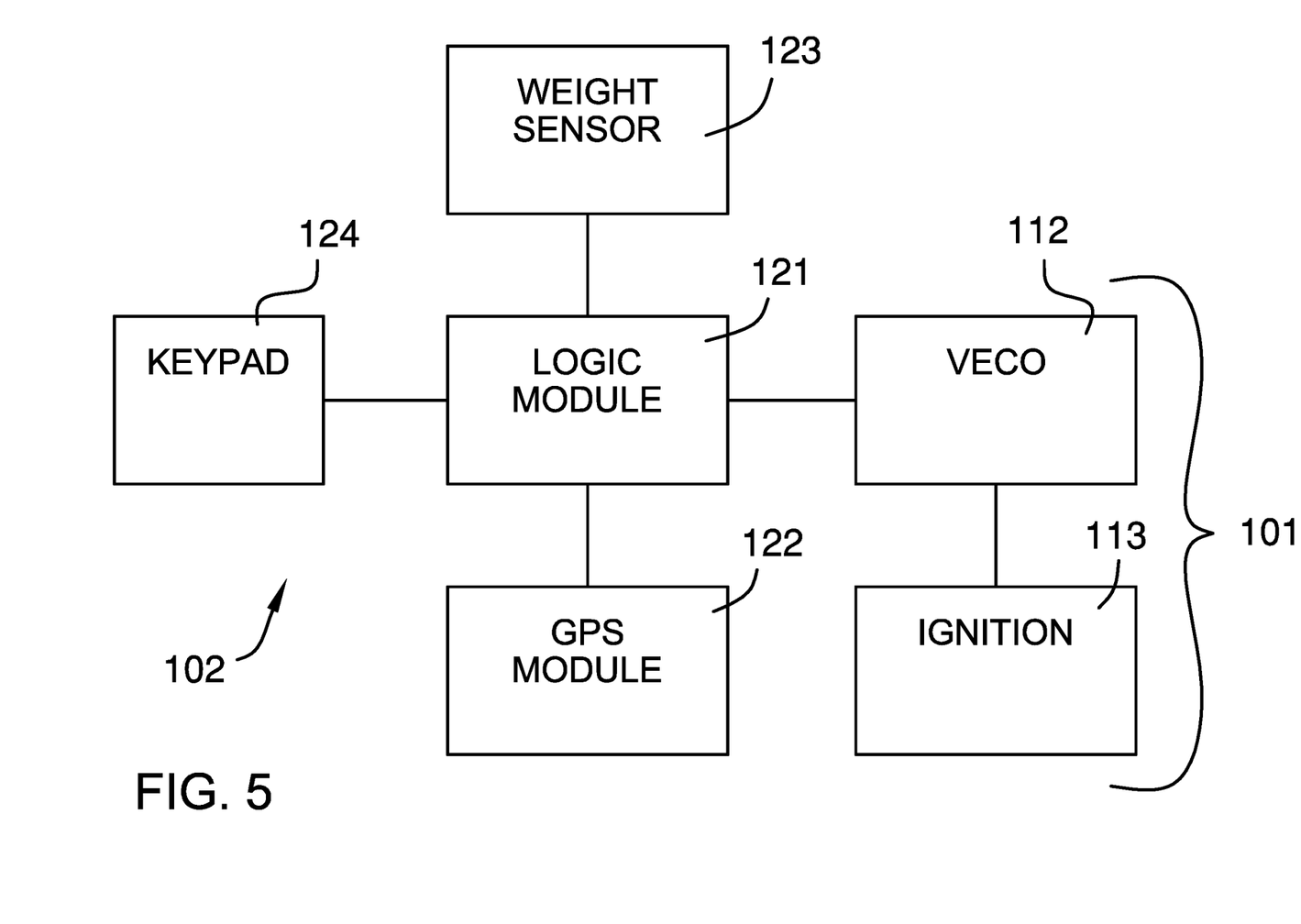
FIG. 5 is a block diagram of an embodiment of the disclosure.
Figure 6:
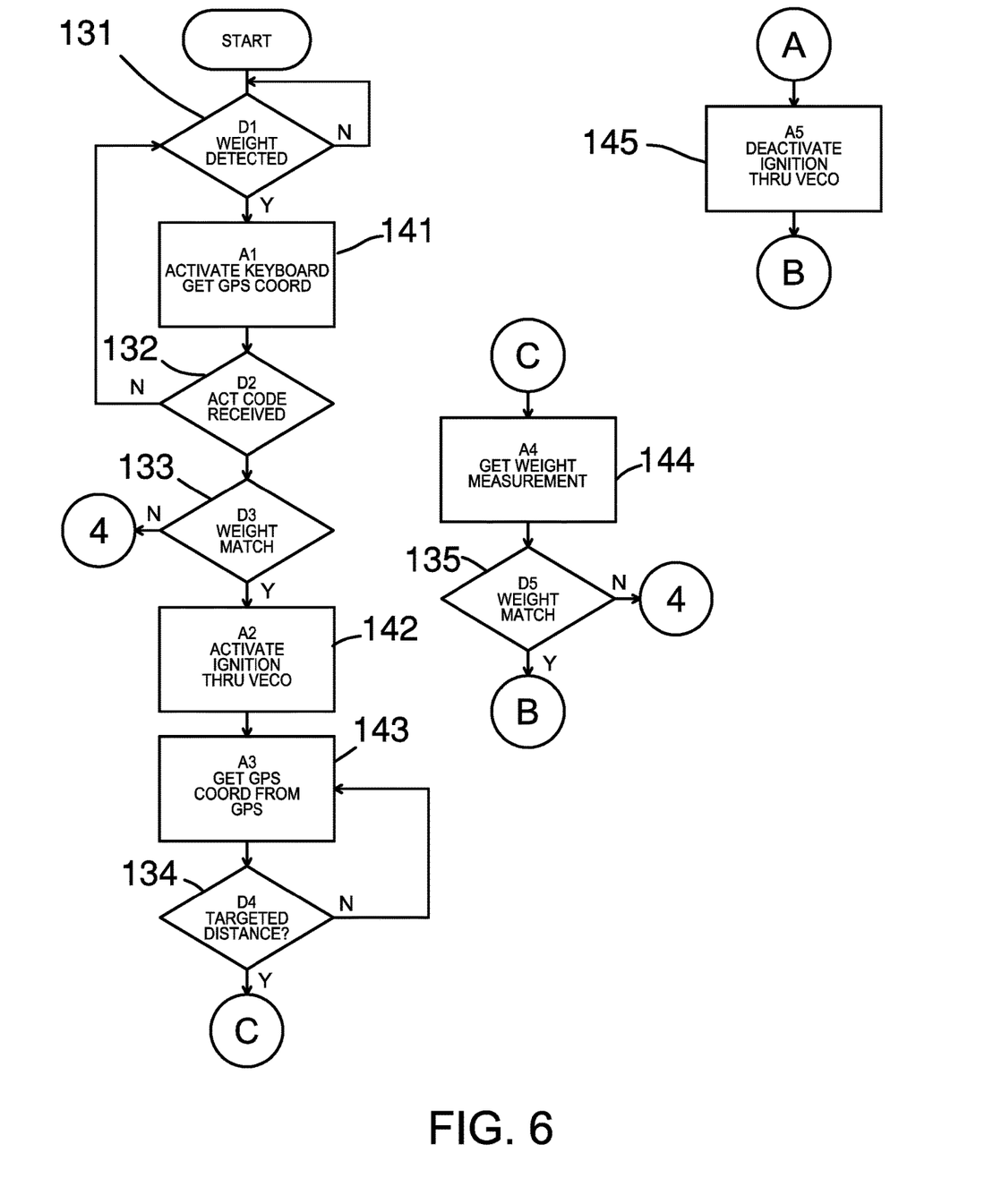
FIG. 6 is a flowchart of an embodiment of the disclosure.

The logic module 121 makes a first decision 131 to determine if an operator 151 occupies the seat 111. The logic module 121 determines this by checking the transmitted load reading from the load cell 123. If the logic module 121 determines that the seat 111 is unoccupied, the logic module 121 loops back to the first decision 131. If the logic module 121 determines that the seat 111 is occupied, the logic module 121 takes a first action 141. The first action 141 comprises: a) activating the keypad 124 such that the operator 151 can enter their security code; and, b) getting the GPS coordinates from the GPS module 122 of the vehicle 101 while the vehicle 101 is in a stationary position. The operator 151 is defined in greater detail elsewhere in this disclosure.

The logic module 121 makes a second decision 132 to determine if the security code has been entered through the keypad 124. The logic module 121 determines this as part of the normal monitoring of the keypad 124. If the logic module 121 determines that the security code of the operator 151 has not been entered, the logic module 121 loops back to the first decision 131. If the logic module 121 determines that an invalid security code has been entered, the logic module 121 loops back to the first decision 131.

If the logic module 121 determines that a valid security code has been entered, the logic module 121 makes a third decision 133 to determine if the weight measured by the load cell 123 matches the weight stored in the database maintained by the logic module 121. If the logic module 121 determines that the weight measured at the load cell 123 does not match the weight in the database, the logic module 121 takes a fifth action 145. The fifth action 145 is described elsewhere in this disclosure. If the logic module 121 determines that the weight measured at the load cell 123 does match the weight in the database, the logic module 121 takes a second action 142 and a third action 143. The second action 142 comprises notifying the VECU 112 to activate the ignition device 113. The third action 143 comprises downloading the current GPS coordinates from the GPS module 122.

The logic module 121 makes a fourth decision 134 to determine if the vehicle 101 has moved from its initial position by more than a previously determined distance. The logic module 121 determines this by comparing the comparing the stationary GPS coordinates initially downloaded by the logic module 121 with the current GPS coordinates received from the GPS module 122. Methods to calculate the distance between two sets of GPS coordinates are well-known and documented in the navigational arts. If the logic module 121 determines that the vehicle 101 has not moved by more than the previously determined distance, the logic module 121 loops back to the third action 143. If the fourth decision 134 determines that the vehicle 101 has moved by more than the previously determined distance, the logic module 121 takes a fourth action 144.

The fourth action 144 comprises downloading a second weight measurement from the load cell 123. The logic module 121 makes a fifth decision 135 to determine whether the second measured weight continues to match the weight stored in the database maintained by the logic module 121. If the logic module 121 determines that the weight measured at the load cell 123 does match the weight in the database, the logic module 121 terminates the monitoring process. If the logic module 121 determines that the second weight measured at the load cell 123 does not match the weight in the database, the logic module 121 takes the fifth action 145. The fifth action 145 comprises notifying the VECU 112 to disable the operation of the ignition device 113. The logic module 121 then terminates the monitoring process.

The following definitions were used in this disclosure:

Bench: As used in this disclosure, a bench is a horizontal supporting surface formed by a chair.

Biometric Device: As used in this disclosure, a biometric device is a security device that identifies an individual through the use of a unique and measurable physiological characteristic of the individual. Typical unique and measurable physiological characteristic include, but are not limited to, fingerprints, DNA, or retina of the eye.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Database: As used in this disclosure, a database refers to: 1) a set of data that is organized and stored in a manner that allows for the search and retrieval of data from the data set; or, 2) the electronic device that stores and organizes a data set as described in the first definition.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that is used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Ignition Device: As used in this disclosure, an ignition device is an electrically or mechanically powered device that starts the operation of a piece of equipment that is powered using a combustion reaction.

Interface: As used in this disclosure, an interface is a physical or virtual boundary that separates two different systems across which information is exchanged.

Keyboard: As used in this disclosure, a keyboard is a panel that further comprises a plurality of buttons that are commonly referred to as keys. The keyboard is commonly used to operate devices including, but not limited to, logical devices and musical instruments.

Load Cell: As used in this disclosure, a load cell is a transducer that measures an applied force and generates an electrical signal that is a known function of the applied force. A load cell is often used to measure weights.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Operator: As used in this disclosure, an operator is an individual who is designated to use or operate a piece of equipment.

Pressure: As used in this disclosure, pressure refers to a measure of force per unit area.

Scale: As used in this disclosure, a scale is an instrument used to measure the weight or mass of an object.

Seat: As used in this disclosure, a seat is a structure that a person can sit on.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Switching Circuit: As used in this disclosure, a switching circuit is non-programmable electrical device that receives one or more digital or analog inputs and uses those digital or analog inputs to generate one or more digital or analog outputs.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A biometric security device comprising:
a vehicle and a security circuit;
wherein the security circuit installs in the vehicle;
wherein the biometric security device is a security device that prevents the unauthorized operation of a vehicle;
wherein the vehicle is adapted for use with an operator;
wherein the vehicle further comprises a seat and a VECU;
wherein the VECU further comprises an ignition device;
wherein the operator sits in the seat when operating the vehicle;
wherein the security circuit takes a first measured weight of the operator;
wherein the security circuit maintains the weight of the operator in the database;
wherein the security circuit compares the first measured weight of the operator weight of the operator that is associated and stored with the security code in the database;
wherein the security circuit takes a second measured weight of the operator;
wherein the security circuit compares the second measured weight of the operator weight of the operator that is associated and stored with the security code in the database;
wherein after the ignition device of the vehicle, a GPS module of the security circuit monitors the span of the distance traveled by the vehicle;
wherein after the vehicle travels a previously determined distance, the security circuit measures the second weight of the operator.

2. The biometric security device according to claim 1
wherein the security circuit is a biometric device;
wherein the security circuit measures the weight of the operator.

3. The biometric security device according to claim 2
wherein the security circuit communicates with the VECU to enable the ignition device of the vehicle;
wherein the security circuit the security circuit communicates with the VECU to disable the ignition device of the vehicle.

4. The biometric security device according to claim 3
wherein the security circuit maintains a database of operators authorized to operate the vehicle;
wherein the security circuit stores a security code that is unique for each operator authorized to operate the vehicle;
wherein the security circuit stores in the database the weight of the operator that is associated with each security code;
wherein the operator enters their security code into the security circuit.

5. The biometric security device according to claim 4
wherein the security circuit uses the measured weight of the operator to biometrically validate that an operator entering a security code is the operator associated with the security code.

6. The biometric security device according to claim 5
wherein if the first measured weight of the operator does not match the measurement of the weight of the operator that is associated and stored with the security code, the security circuit disables the ignition device of the vehicle;
wherein if the second measured weight of the operator does not match the measurement of the weight of the operator that is associated and stored with the security code, the security circuit disables the ignition device of the vehicle.

7. The biometric security device according to claim 6 wherein the weight of the operator is measured while the operator is in the seat.

8. The biometric security device according to claim 7
wherein the security circuit is a programmable electrical circuit;
wherein the security circuit monitors a GPS coordinates of the vehicle.

9. The biometric security device according to claim 8
wherein the security circuit comprises a logic module, the GPS module, a load cell, and a keypad;
wherein the logic module, the GPS module, the load cell, and the keypad are electrically interconnected.

10. The biometric security device according to claim 9 wherein the logic module is a programmable electronic device.

11. The biometric security device according to claim 10 wherein the GPS module is an electrical device;
wherein the GPS module communicates with the GPS to determine the GPS coordinates of the GPS module;
wherein the GPS module transfers the GPS coordinates to the logic module;
wherein the logic module communicates with the GPS module to determine the GPS coordinates of the GPS module when the operator first sits in the seat;
wherein the logic module regularly downloads the GPS coordinates of the GPS module to the logic module such that the logic module can calculate how far the vehicle has traveled with the operator in the seat.

12. The biometric security device according to claim 11
wherein the load cell is a weight sensor that mounts in the seat;
wherein the load cell transmits an electrical signal that indicates that an operator is in the seat;
wherein the load cell transmits an electrical signal that allows the logic module to calculate the weight of the operator.

13. The biometric security device according to claim 12
wherein the keypad is an interface device;
wherein the logic module controls and monitors the operation of the keypad;
wherein the operator uses the keypad to enter the security code required to enable the operation of the vehicle;
wherein the logic module compares the entered security code with the security codes maintained in the database of operators authorized to operate the vehicle.

14. The biometric security device according to claim 9 wherein the GPS module is an electrical device;
wherein the GPS module communicates with the GPS to determine the GPS coordinates of the GPS module;
wherein the GPS module transfers the GPS coordinates to the logic module;
wherein the logic module communicates with the GPS module to determine the GPS coordinates of the GPS module when the operator first sits in the seat;
wherein the logic module regularly downloads the GPS coordinates of the GPS module to the logic module such that the logic module can calculate how far the vehicle has traveled with the operator in the seat.

15. The biometric security device according to claim 14 wherein the load cell is a weight sensor that mounts in the seat;
wherein the load cell transmits an electrical signal that indicates that an operator is in the seat;
wherein the load cell transmits an electrical signal that allows the logic module to calculate the weight of the operator.

16. The biometric security device according to claim 15 wherein the keypad is an interface device;
wherein the logic module controls and monitors the operation of the keypad;
wherein the operator uses the keypad to enter the security code required to enable the operation of the vehicle;
wherein the logic module compares the entered security code with the security codes maintained in the database of operators authorized to operate the vehicle.

17. The biometric security device according to claim 16 wherein the logic module is a programmable electronic device;
wherein the logic module makes a first decision to determine if an operator occupies the seat;
wherein the first action comprises: a) activating the keypad such that the operator can enter their security code; and, b) getting the GPS coordinates from the GPS module of the vehicle while the vehicle is in a stationary position;
wherein the logic module makes a second decision to determine if the security code has been entered through the keypad;
wherein the logic module determines makes a third decision to determine if the weight measured by the load cell matches the weight stored in the database maintained by the logic module;
wherein the logic module takes a second action and a third action;
wherein the second action comprises notifying the VECU to activate the ignition device;
wherein the third action comprises downloading the current GPS coordinates from the GPS module;
wherein the logic module makes a fourth decision to determine if the vehicle has moved from its initial position by more than a previously determined distance;
wherein the logic module makes a fifth decision to determine whether the second measured weight continues to match the weight stored in the database maintained by the logic module;
wherein the logic module takes the fifth action;
wherein the fifth action comprises notifying the VECU to disable the operation of the ignition device.

\* \* \* \* \*